Patented Mar. 30, 1926.

1,578,960

UNITED STATES PATENT OFFICE.

ALEX BROOKING DAVIS, OF CINCINNATI, OHIO, ASSIGNOR TO A. B. DICK COMPANY, OF CHICAGO, ILLINOIS, A CORPORATION OF ILLINOIS.

STENCIL SHEET AND COATING SOLUTION THEREFOR.

No Drawing. Application filed July 3, 1925. Serial No. 41,436.

*To all whom it may concern:*

Be it known that I, ALEX BROOKING DAVIS, a citizen of the United States, residing at Cincinnati, in the county of Hamilton and State of Ohio, have invented certain new and useful Improvements in Stencil Sheets and Coating Solutions Therefor, of which the following is a specification.

My invention relates particularly to type-impressible stencil-sheets of the sort in which is employed a porous base such as Yoshino having an ink-impervious coating which may be stenciled by pressure such as impact of type and the like thereon. My object is to produce a stencil-sheet which can be manufactured easily and at low cost, which may be readily stencilized, which will be stable and durable and from which a large number of prints of high quality may be obtained. I have found that the esters of starch, both the aromatic and the aliphatic or fatty esters, possess properties which adapt them for stencil use, some of them particularly when modified by the addition of a suitable agent such, for example, as a non-volatile material soluble in the same solvent as that employed to dissolve the starch ester.

In carrying out my invention in a preferred form I may employ a fatty acid ester of starch such as starch acetate. This may be prepared by acetylating purified corn starch with acetic anhydride in the proportion of 450 pounds of starch to 750 pounds of acetic anhydride in the presence of a catalizer and a solvent. As a solvent xylol is suitable. Starch acetate so prepared is water-insoluble but almost completely soluble in acetone. In fact, the solution is so complete as to leave only a faint opalescence as an indication of a minute quantity of insoluble material remaining. Ordinarily such acetate alone and without modification would "set" upon the base sheet in a film too hard for easy stencilization—a difficulty which may be overcome by employing a higher starch ester. I prefer, however, to employ the starch ester above described and to permanently soften this by a suitable non-volatile agent, such as an ester of phosphoric acid or the like. Some of these are crystalline in structure, which I consider objectionable and while other substances may be added to prevent their crystallization I prefer to employ phenolic esters of phosphoric acid, which are non-crystalline and of these excellent results may be obtained by using tricresyl phosphate. Other non-volatile or substantially non-volatile modifying or softening agents may be employed to give an internal lubricating effect, thereby promoting ease of stencilization and a number of esters of both the aromatic and the aliphatic series will answer for this purpose but I prefer to employ butyl tartrate. Lubricants other than esters may, however, be employed and will give goods results.

As a specific illustration of a practice of my invention the following directions will serve: 35 grams of starch acetate, preferably prepared as above pointed out, are dissolved in 90 c. c. of acetone at the boiling point of the acetone. Into this solution there may be poured 35 grams of tricresyl phosphate and 20 c. c. of butyl tartrate together, if it be desired to color the mixture, with a suitable (preferably acetone-soluble) dyestuff. The solution may then be allowed to cool to ordinary temperature. Then, the solution being contained in a suitable pan, sheets of Yoshino may be floated upon or drawn over the surface of the soluton, excess thereof being removed and returned to the pan by drawing the sheets, after impregnation, over a taut wire. The sheets may then be hung up to cure, i. e. to permit the volatilization of the acetone, which requires but a few hours. They are then ready for use, the Yoshino being coated or impregnated with a homogeneous, type-impressible substance, mainly of highly dispersed starch acetate.

It is, of course, obvious that starch acetate can be acetylated to a higher or lower degree than as above indicated and that, if so, this might require some change in the character of the solvent employed; consequently there is no intention to limit the invention to the use of acetone, which, however, I have found suitable in the practice as above explained.

What I claim is:—

1. A type-impressible stencil-sheet consisting of a porous base having a coating including a starch ester.

2. A type-impressible stencil-sheet consisting of a porous base having a coating including starch acetate.

3. A type-impressible stencil-sheet consisting of a porous base having a coating including a starch ester and a softening agent.

4. A type-impressible stencil-sheet consisting of a porous base having a coating including starch acetate and a softening agent.

5. A type-impressible stencil-sheet consisting of a porous base having a coating including a starch ester, a softening agent and a lubricating agent.

6. A type-impressible stencil-sheet consisting of a porous base having a coating including starch acetate, a softening agent and a lubricating agent.

7. A type-impressible stencil-sheet consisting of a porous base sheet having a coating including starch acetate and a phosphoric acid ester.

8. A type-impressible stencil-sheet consisting of a porous base sheet having a coating including starch acetate and tricresyl phosphate.

9. A type-impressible stencil-sheet consisting of a porous base sheet having a coating including starch acetate, a phosphoric acid ester and butyl tartrate.

10. A type-impressible stencil-sheet consisting of a porous base sheet having a coating including starch acetate, tricresyl phosphate and butyl tartrate.

11. A solution for coating type-impressible stencil-sheets consisting of starch acetate dissolved in acetone, to which has been added a phosphoric acid ester.

12. A solution for coating type-impressible stencil-sheets consisting of starch acetate dissolved in acetone, to which has been added a phosphoric acid ester and an aliphatic ester.

13. A solution for coating type-impressible stencil-sheets consisting of starch acetate dissolved in acetone, to which has been added tricresyl phosphate and butyl tartrate.

14. A solution for coating type-impressible stencil-sheets consisting of starch acetate dissolved in acetone, to which has been added tricresyl phosphate and a lubricant.

15. A solution for coating type-impressible stencil-sheets consisting of starch acetate dissolved in acetone, to which has been added tricresyl phosphate, a modifier and a lubricant.

This specification signed and witnessed this 29th day of June, 1925.

ALEX BROOKING DAVIS.